United States Patent [19]

Ogiwara et al.

[11] Patent Number: 4,864,651
[45] Date of Patent: Sep. 5, 1989

[54] LIGHT COMMUNICATION APPARATUS WITH TRACKING ABILITY

[75] Inventors: Satoshi Ogiwara; Izumi Ichikawa, both of Atsugi; Haruo Imano, Yokohama; Genmei Miura, Tokyo, all of Japan

[73] Assignee: Canon Kabushiki Kaisha, Tokyo, Japan

[21] Appl. No.: 920,127

[22] Filed: Oct. 17, 1986

[30] Foreign Application Priority Data

Oct. 22, 1985 [JP] Japan ................................ 60-234554
Feb. 24, 1986 [JP] Japan .................................. 61-37316

[51] Int. Cl.⁴ .............................................. H04B 9/00
[52] U.S. Cl. .................................... 455/617; 250/578; 358/213.15; 455/619; 370/1
[58] Field of Search ............... 455/617, 606, 607, 612, 455/618, 619, 69; 370/3, 1; 250/578, 209; 329/146; 358/213.15, 213.11, 213.17, 213.18

[56] References Cited

U.S. PATENT DOCUMENTS

| | | | |
|---|---|---|---|
| 4,262,366 | 4/1981 | Eumurian | 455/617 |
| 4,316,141 | 2/1982 | Adolfsson et al. | 455/617 |
| 4,558,920 | 12/1985 | Newton et al. | 350/96.16 |
| 4,662,004 | 4/1987 | Freriksen et al. | 455/607 |
| 4,709,416 | 11/1987 | Patterson | 455/618 |

*Primary Examiner*—Robert L. Griffin
*Assistant Examiner*—Leslie Van Beek
*Attorney, Agent, or Firm*—Fitzpatrick, Cella, Harper & Scinto

[57] ABSTRACT

A light signal receiver comprises a plurality of photo-sensors, a detector for detecting signal levels of light signals sensed by the photo-sensors, a selector for selecting those photo-sensors which result in a proper output signal, and output means for combining the signals sensed by the selected photo-sensors to produce the output signal.

11 Claims, 7 Drawing Sheets

| 1 | 1 | 1 |
|---|---|---|
| 2 | 5 | 3 |
| 1 | 3 | 1 |

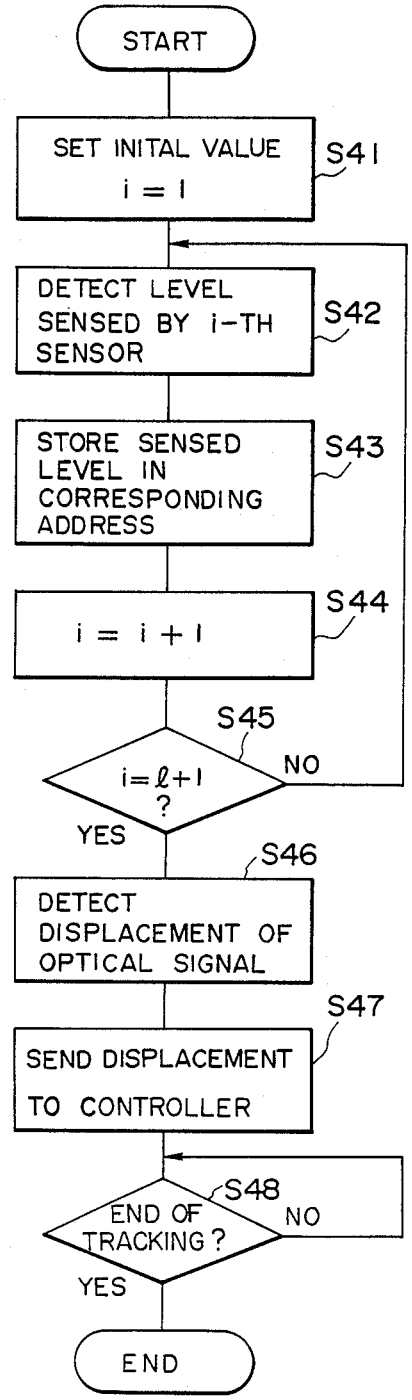

LIGHT COMMUNICATION APPARATUS WITH TRACKING ABILITY

BACKGROUND OF THE INVENTION

1. Field of the Invention

The present invention relates to a light communication apparatus for light spatial communication.

2. Related Background Art

In many prior art light signal receivers in a light spatial communication system, a single photo-sensing element has been used. In such an apparatus, it is difficult to receive a light signal having a large energy area even if a light beam is formed by an optical system. In a communication over distance, reduction of received light power due to spread of the beam is unavoidable. Where it is desired to effectively use light energy in a larger area by using a number of photo-sensing elements and optical system, intensity of an incident light signal is high in some areas and low in other areas, and the output from the latter areas, includes a spurious noise component and the overall S/N ratio is lowered.

SUMMARY OF THE INVENTION

It is an object of the present invention to improve a light communication apparatus.

It is another object of the present invention to eliminate defects in the prior art apparatus.

It is still another object of the present invention to enable proper light communication.

It is still another object of the present invention to select one of a plural photo-sensing elements which is at the best receiving condition.

It is still another object of the present invention to select a group of photo-sensing elements from a plurality of photo-sensing elements which assures the highest overall S/N ratio so that a S/N ratio for the received signal is always kept at best condition.

It is still another object of the present invention to feed a received signal back to a transmitting station to obtain a proper received signal.

According to the present invention, these objects are attained by means of a light signal receiver having a plurality of photo-sensors, in which the levels of signals sensed by the photo-sensors are detected, and one or more photosensors are selected on the basis of the detected signal levels, to produce a signal having desired characteristics. The signals from the selected photo-sensors, if a plurality are selected, are preferably combined to produce a reception signal. According to one aspect of the invention, the selection means calculates a ratio of the sum of the signal levels of the sensed signals with a noise level corresponding to the number of summed photo-sensors, and selects a set of photo-sensors which provides the highest ratio. According to another aspect of the invention, the selection means selects those photo-sensors which assure improvement of a signal-to-noise ratio.

According to another aspect of the invention, a light communicaytion system is provided, in which a receiver receives a light signal from a transmitter and detects a displacement of the light signal relative to the receiver. A signal indicating the detection is sent to the transmitter, and the transmitter adjusts transmission in accordance with the detection signal.

These and other objects and features of the present invention will be apparent from the following description of the preferred embodiments.

BRIEF DESCRIPTION OF THE DRAWINGS

FIG. 8 shows a flow chart of an operation of the second embodiment.

DETAILED DESCRIPTION OF THE PREFERRED EMBODIMENTS

The preferred embodiments of the present invention are now explained with reference to the accompanying drawings.

Figure 1:
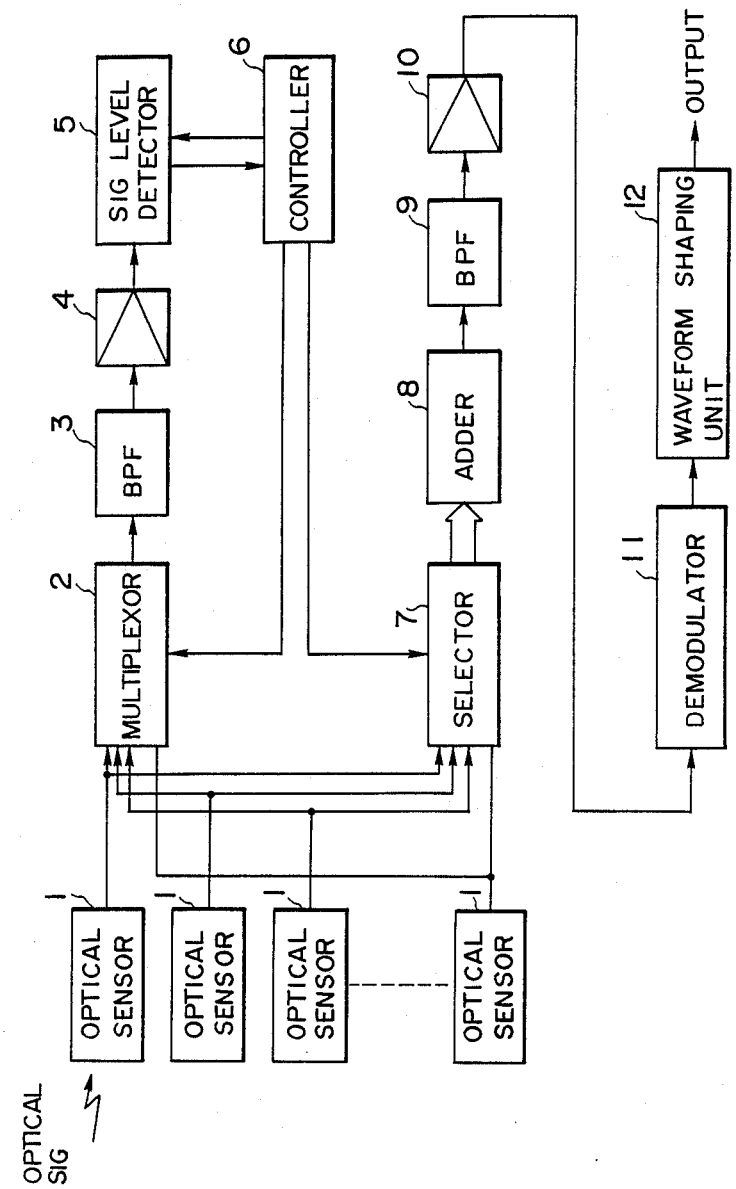
FIG. 1 shows a block diagram of one embodiment of the present invention.

FIG. 1 shows a block diagram of one embodiment of the present invention. Numeral 1 denotes a photo-sensor (or optical sensor element) in which a photo-sensing element is incorporated. Numeral 2 denotes a multiplexor which selects a signal from any one of the photo-sensors 1 by a command from a controller 6 to be described later and supplies it to a band-pass filter 3. Numerals 4 and 10 denote AC-coupled amplifiers, numeral 5 denotes a signal level detector, and numeral 6 denotes the controller which selects a photo-sensor 1 which is most suitable for receiving the light, selects the signal of the desired photo-sensor 1, stores a received signal level and stores noise levels versus the number of photo-sensors. The controller 6 comprises a microcomputer and its peripherals such as a read-only memory (ROM) and a random access memory (RAM). Numeral 7 denotes a signal selector which passes only the signals from the photo-sensor or photo-sensors 1 which have been selected by the command from the controller 6. Numeral 8 denotes a signal adder which analog-adds signals supplied from the signals selector 7, numeral 9 denotes a band-pass filter, numeral 11 denotes a demodulator and numeral 12 denotes a waveform shaper. In the present embodiment, nine photo-sensors are provided, although any number of photo-sensors may be provided.

When a light signal is applied to the photo-sensor 1, it is converted to an electrical signal, which is supplied to the multiplexor 2 and the signal selector 7. In the multiplexor 2, only one of the nine photo-sensor outputs is selected, and it passes through the band-pass filter 3, and is amplified by the AC-coupled amplifier 4, and an output level of the amplifier 4 is detected by the signal level detector 5. The selection of the photo-sensor 1 by the multiplexor 2 is under control of the controller 6, and the detected data is supplied to the controller 6 and stored therein. When the signal levels of all of the nine photo-sensors 1 have been detected, they are arithmetically operated upon in the controller 6 to determine particular outputs of the photo-sensors 1 which will result in the highest S/N ratio. Based on this, a command is sent from the controller 6 to the signal selector 7 to select only required signals, which are supplied to the adder 8. The adder 8 analog-adds the input signals. The output of the adder 8 passes through the band-pass filter 9 and is applied to the AC-coupled amplifier 10. The output of the amplifier 10 is demodulated by the demodulator 11, and shaped by the waveform shaper 12.

The selection of the photo-sensors 1 to assure the highest S/N ratio is explained below.

Table 1 shows the noise level of the analog sum of the received signals versus the number of photo-sensors 1. Those values are stored in the controller 6 in advance.

TABLE 1

| Number of Photo-Sensors | Noise Level |
| --- | --- |
| 1 | 1.0 |
| 2 | 1.4 |
| 3 | 1.7 |
| 4 | 2.0 |
| 5 | 2.2 |
| 6 | 2.4 |
| 7 | 2.6 |
| 8 | 2.8 |
| 9 | 3.0 |

Figures 2, 3:
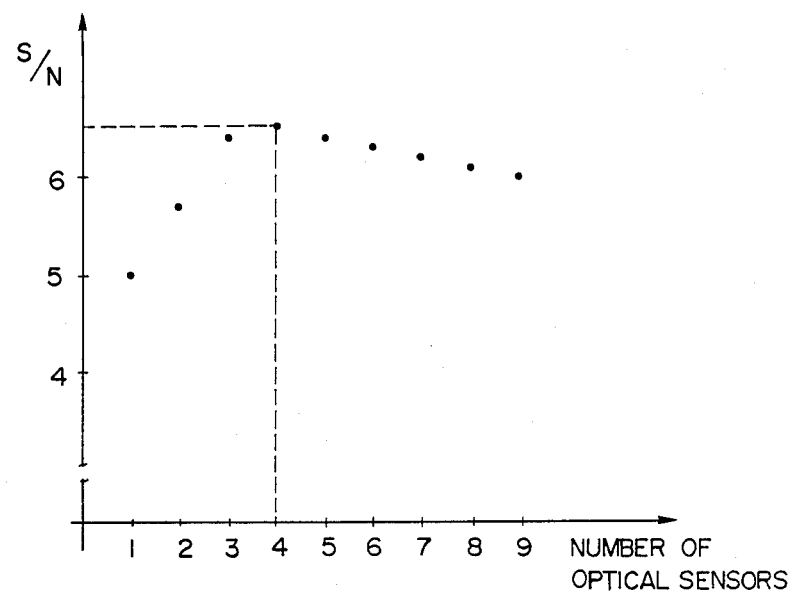
FIG. 2 shows an arrangement of photo-sensing elements of the embodiment and a received light signal level.
FIG. 3 shows the relationship between the S/N ratio and the number of photo-sensing elements in the embodiment.

Assuming that the nin photo-sensors 1 are arranged in a 3×3 matrix, and the signal levels received by the respective photo-sensors 1 are represented by levels shown in FIG. 2, a relationship between the sum of signal levels as added in descending order and the noise level is shown in Table 2, in which the number represented by the number of photo-sensors, S represents the sum of signal levels as added in descending order, and N represents a noise level for the number of photo-sensors.

TABLE 2

| Number | S | N | S/N |
| --- | --- | --- | --- |
| 1 | 5 | 1.0 | 5.0 |
| 2 | 8 | 1.4 | 5.7 |
| 3 | 11 | 1.7 | 6.4 |
| 4 | 13 | 2.0 | 6.5 |
| 5 | 14 | 2.2 | 6.4 |
| 6 | 15 | 2.4 | 6.3 |
| 7 | 16 | 2.6 | 6.2 |
| 8 | 17 | 2.8 | 6.1 |
| 9 | 18 | 3.0 | 6.0 |

This is graphically shown in FIG. 3. As seen from the graph, the S/N ratio is highest when the top four signal levels are selected. That is, the photo-sensors having the signal levels 5, 3, 3 and 2 shown in FIG. 2 are to be selected.

Figure 4:
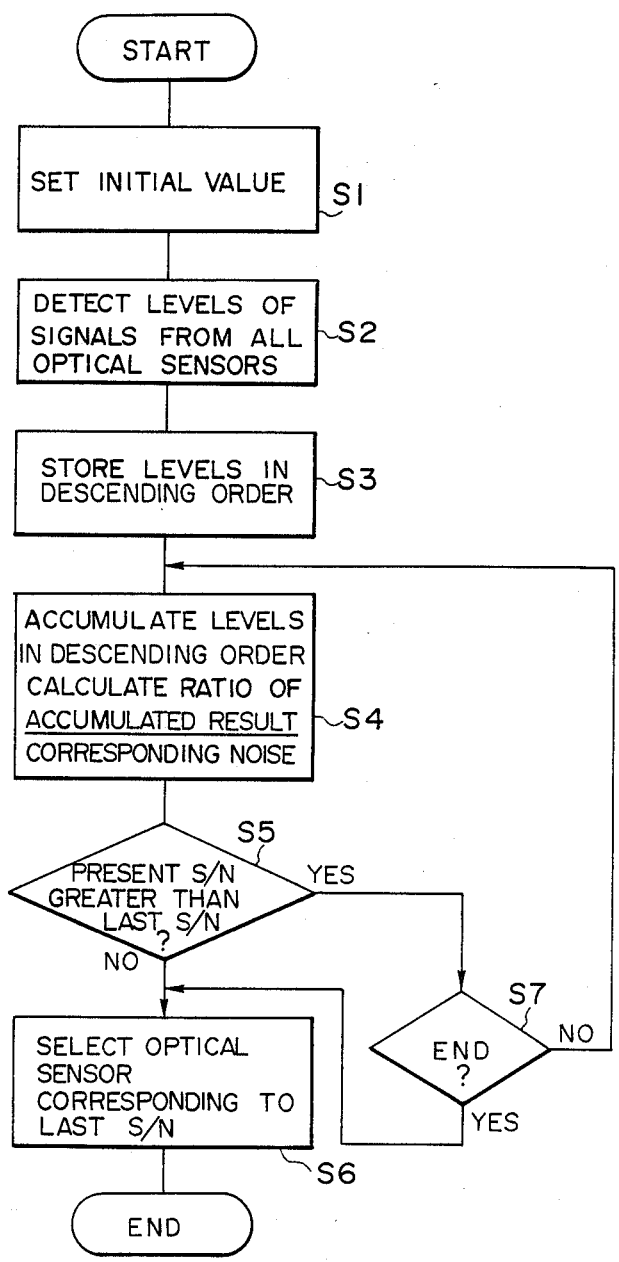
FIG. 4 shows a flow chart of an operation of the embodiment.

The above operation is explained with reference to a flow chart of FIG. 4. A program for the operation of the flow chart is previously stored in the ROM of the controller 6.

In a step S1, the S/N ratio is initially set to zero.

In a step S2, the signal levels of the respective photo-sensors 1 are detected by the signal level detector 5.

In a step S3, the signal levels are stored in descending order. (In the present embodiment, the signal levels are 5, 3, 3, 2, 1, 1, 1, 1, 1 in descending order).

In a step S4, a ratio (5.0) of the highest signal level (5) (one photo-sensor 1) and the corresponding noise level (1.0, see Table 2) is determined. Since it is larger than the previous S/N ratio (0), the process proceeds to a step S7.

In the step S7, whether all photo-sensors 1 have been examined or not is checked. In the present case, the process goes back to the step S4.

In the step S4, a ratio (5.7) of the sum (8) of the second largest signal level (3) and the previous signal level (5) and the corresponding noise level (1.4) (two photo-sensors 1) is determined, and since it is larger than the previous S/N ratio (5.0), the process goes to the step S7. This step is looped until the ratio determined in the step S4 becomes smaller than the previous S/N ratio. In the fifth run, the sum of the signal levels is 14 and the corresponding noise level is 2.2 (five photo-sensors 1), and the S/N ratio is 6.4 which is smaller than the previous (fourth run) S/N ratio 6.5. Thus, the process proceeds to a step S6 and the photo-sensors 1 (four photo-sensors 1 having the signal levels 5, 3, 3 and 2) which give the previous S/N ratio are selected.

If the S/N ratio determined in the step S4 does not become smaller than the previous S/N ratio, the process ends in the step S7 and all photo-sensors 1 are selected.

In this manner, by providing a plurality of photo-sensors and selecting the photo-sensors, the S/N ratio of the received signal can be always set at the highest value and a data error rate is lowered. In the present embodiment, nine photo-sensors are arranged in 3×3 matrix, although the number of photo-sensors and the arrangement of is not restrictive and the arrangement and the spacing between the adjacent photosensors, are not restricted to what is shown in this embodiment.

An optical system such as a lens may be used for each of the photo-sensors 1, although it is not shown in the embodiment, to condense more light.

In accordance with the present embodiment, the S/N ratio of the received signal is maximized, the condition to receive the light signal is optimized and the error rate is lowered.

In the present embodiment, the photo-sensors are selected to assure the highest S/N ratio. However, if a shift or displacement of the light signal from the transmitting station relative to the receiver is large, a proper received signal may not be obtained even if the photo-sensors are selected at the receiving station as described above.

In a second embodiment, the shift of the light signal is detected in the receiving station based on a light intensity distribution of the received signal and is fed back to the transmitting station so that the transmitting station adjusts tracking in accordance with the feedback by adjusting the transmission position of the light signal from the transmitter signal.

Figure 5:
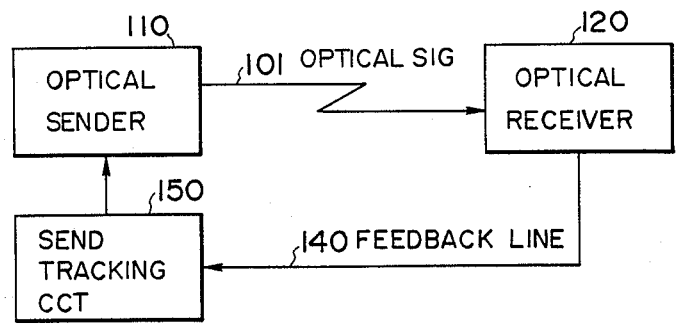
FIG. 5 shows a block diagram of a second embodiment of the present invention.
Figure 6:
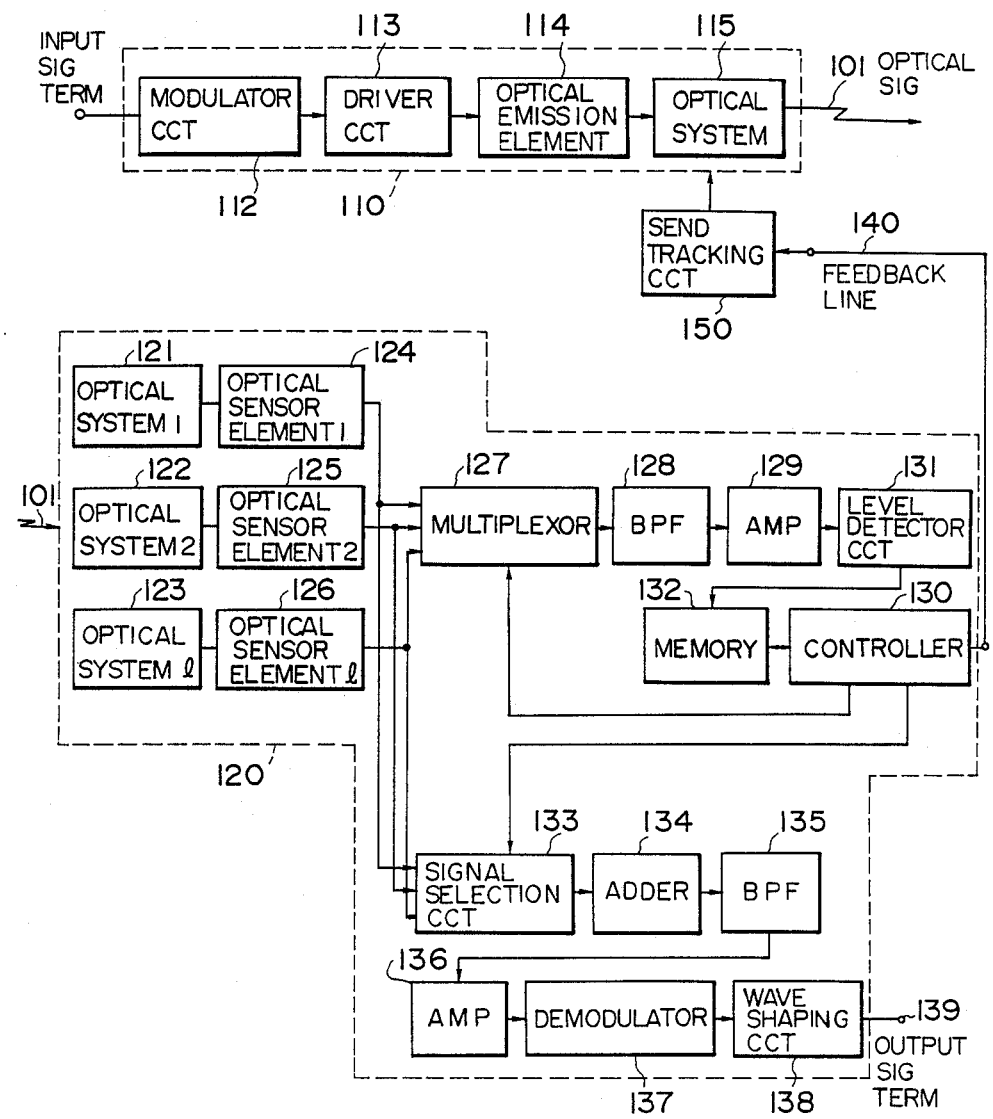
FIG. 6 shows a detailed block diagram of the second embodiment.

FIG. 5 shows a configuration of the second embodiment of the present invention, and FIG. 6 shows a detail of the light communication system of the second embodiment. In FIG. 6, a signal applied to a signal input terminal 111 is modulated by a modulator 112, and the modulated signal is applied to a light emitting element (or optical emission element) 114 through a light emitting element driver 113. The electrical signal is converted to a light signal by the light emitting element 114. The light emitting element 114 may be a laser diode or a light emitting diode. The light signal is collimated (101) by an optical system 115 such as a flenel lens, and the collimated light is emitted to a space.

In the receiving station, the collimated light 101 propagated through the space is condensed by optical systems 121-123 such as flenel lenses, and the light signals are converted to electrical signals by photo-sensors 124-126 such as PIN photo-diodes corresponding to the respective optical system. The area plurality (l in the present embodiment) of sets of optical systems 121-123 and corresponding photo-sensors 124-126, and they are arranged in an m×n matrix.

The electrical signals from the photo-sensors 124-126 are sequentially selected, one at a time, by the multiplexor 127 by a signal from the controller 130. The selected electrical signal passes through the band-pass filter 128 and is supplied to the amplifier 129 which amplifies the input signal to a predetermined level. The output level of the amplifier 129 is detected by the level detector 131 and the detected level is stored in the memory 132. This operation is repeated l times and a light intensity distribution is prepared.

The controller 130 reads out the light intensity distribution stored in the memory 132 and transmits it to the tracking circuit 150 of the transmitting station as a contriol signal via the feedback line 140 such as a telephone line so that the light receiver 110 is tracking-controlled and the transmitter and the receiver are always kept at an optimum positional relationship.

Figure 7:
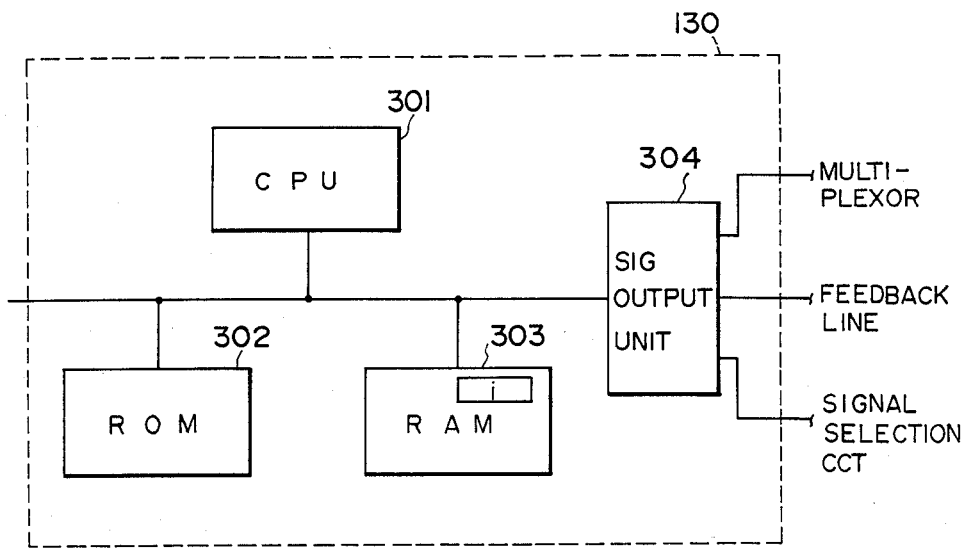
FIG. 7 shows a block diagram of a controller 130 of the second embodiment.

FIG. 7 shows a block diagram of the controller. Under control of a program stored in a ROM 32, a CPU 1 prepares the light intensity distribution in the memory 132 by using a RAM 303 and sends control signals to the multiplexor 127 and the signal selector 133 through a signal output circuit 304. The RAM 303 stores a count value i for a counter or pointer.

FIG. 8 shows a control flow chart of the controller. In a step S41, an initial value is set and i is set to "1". In a step S42, an i-th photo-sensor ("2" is a count value of the counter) is selected by the multiplexor 127 and the light level thereof is detected. Since the i is now "1", first photo-sensor is selected. In a step S43, the light level is stored at an address in the memory 132. In a step S44, i is incremented. In a step S45, whether i is equal to l or not is checked. If it is not, the process returns to the step S42 and the steps S42-S45 are repeated. If i is equal to l, the process proceeds to a step S46. At this moment, the light intensity distribution is completed in the memory 132.

In the step S46, the shift of the light signal is detected based on the light intensity distribution. In a step S47, the shift information is sent to the tracking circuit 50 which is a tracking controller of the transmitter through the feedback line 40. In a step S48, if the end of tracking is detected, the position control is terminated and the reception of the light signal is started.

In the receiver, the output signals from the photo-sensors 124 to 126 are supplied to the signal selector 133 which may comprise an analog switch. The light intensity distribution information is read from the controller 130 and only the channels in which the light signal components are present are selected. The outputs thereof are taken out of an output terminal 139 through an adder 134, a band-pass filter 135, an amplifier 136, a demodulator 137 and a waveform shaper 138.

The feedback means is not limited to the telephone line but it may include a transmitter and a receiver for feedback control by the light signal. The light receiver may be constructed for position control. Instead of the tracking control, the light intensity of the light transmitter may be controlled.

In accordance with the second embodiment, light communication with less communication obstacle is attained.

The present invention is not limited to the illustrated embodiments but various modifications may be made.

What we claim is:

1. A light signal receiver comprising:
    a plurality of photo-sensors;
    detection means for detecting signal levels of light signals sensed by said photo-sensors;
    selection means for selecting those photo-sensors which result in a proper signal based on the signal levels detected by said detection means; and
    output means for combining the signals from the ones of said photo-sensors selected by said selection means to produce a reception signal,
    wherein said selection means calculates a ratio of a sum of signal levels of the sensed signals as summed in descending order and a noise level corresponding to the number of summed photo-sensors and selects a set of photo-sensors which assures the highest ratio.

2. A light signal receiver according to claim 1, wherein said output means analog-adds the signals of the photo-sensors.

3. A light signal receiving comprising:
    a plurality of photo-sensors;
    detection means for detecting signal levels of light signals sensed by said photo-sensors; and
    selection means for selecting those photo-sensors with result in a proper signal based on the signal levels detected by said detection means,
    wherein said selection means calculates a ratio of a sum of signal levels of the sensed signals as summed in descending order and a noise level corresponding to the number of summed photo-sensors and selects a set of said photo-sensors which assures the highest ratio.

4. A light signal receiver according to claim 3, further comprising combining means for combining the signals sensed by the ones of said photo-sensors which are selected by said selection means and means for outputting the combined signal as a reception signal.

5. A light signal receiver according to claim 4, wherein said combining means analog-adds the signals of the ones of said photo-sensors which are selected by said selection means.

6. A light communication system comprising:
    a transmitter for transmitting information by means of a light signal; and
    a receiver for receiving the light signal from said transmitter, including detection means for detecting a displacement of the light signal on the receiver, and means for sending a detection signal of said detection means to said transmitter,
    said transmitter adjusting the transmission signal in accordance with the detection signal sent from said receiver;
    wherein said receiver includes a plurality of photo-sensing means, and said detection means prepares light intensity distribution data based on the light signals sensed by said photo-sensing means and detects the displacement of the light signal based on the light intensity distribution data.

7. A light communication system according to claim 6, wherein said light intensity distribution data contains information regarding positions of said photo-sensing means and their corresponding light intensities.

8. A light communication system according to claim 6, wherein the transmission signal is adjusted by adjusting a transmission position of the light signal from the transmitter.

9. A light communication system according to claim 6, wherein the transmission signal is adjusted by adjusting the light intensity of the light signal transmitted from the transmitter.

10. A light communication system according to claim 6, wherein the detection signal is sent from the receiver to the transmitter through a line.

11. A light communication system according to claim 6, wherein the detection signal is sent from the receiver to the transmitter by light communication.

* * * * *

UNITED STATES PATENT AND TRADEMARK OFFICE
CERTIFICATE OF CORRECTION

PATENT NO. : 4,864,651
DATED : September 5, 1989
INVENTOR(S) : Satoshi Ogiwara, et al.

It is certified that error appears in the above-identified patent and that said Letters Patent is hereby corrected as shown below:

TITLE PAGE:

[56]  References Cited

"Freriksen et al." should read --Fredriksen et al.--.

Insert  --4,481,539 11/1984 Meise et al. 358/213.17, and 3,919,468 11/1975 Weimer 358/213.15, and 4,488,178 12/84 Koslov et al. 358/215.17--.

Insert  --FOREIGN PATENT DOCUMENTS 216641A 10/1985 Japan Sugiyama 455/617--?

COLUMN 1:

Line 20, "system," should read --systems--.

Line 22, "areas," should read --areas--.

Line 34, "a" should be deleted.

Line 63, "communicaytion" should read --communication--.

COLUMN 4:

Line 28, "and the" should be deleted.

Line 29, "arrangement of is not restrictive" should be deleted.

Line 30, "and" should read --of and--.

UNITED STATES PATENT AND TRADEMARK OFFICE
CERTIFICATE OF CORRECTION

PATENT NO. : 4,864,651

DATED : September 5, 1989

INVENTOR(S) : Satoshi Ogiwara, et al.

It is certified that error appears in the above-identified patent and that said Letters Patent is hereby corrected as shown below:

COLUMN 5:

Line 20, "triol" should read --trol--.

COLUMN 6:

Line 23, "light signal receiving" should read --light signal receiver--.

Line 28, "with" should read --which--.

Signed and Sealed this

Ninth Day of April, 1991

Attest:

HARRY F. MANBECK, JR.

*Attesting Officer*  *Commissioner of Patents and Trademarks*